United States Patent Office 3,657,314
Patented Apr. 18, 1972

3,657,314
CARBOXYLIC ACID ESTERS OF DI-LOWER
ALKYLHYDROQUINONES
Eduard K. Kleiner, Dobbs Ferry, N.Y., assignor to Ciba-Geigy Corporation, Greenburgh, N.Y.
No Drawing. Filed Dec. 30, 1968, Ser. No. 788,098
Int. Cl. C07c 69/38, 69/76, 121/66
U.S. Cl. 260—465 D                          10 Claims

ABSTRACT OF THE DISCLOSURE

Organic materials, particularly synthetic polymers such as polypropylene, are protected against oxidation in air, thermal degradation or deterioration by including, in such substances, a stabilizing amount of an antioxidant. The antioxidant is obtained by reacting (a) and $\alpha,\beta$-unsaturated ester of a hindered hydroquinone and (b) a malonate or a related compound with an active methylene group.

DETAILED DISCLOSURE

The present invention is concerned with novel compounds which are useful as antioxidants for organic materials and particularly, as antioxidants for synthetic polymers such as, for example, polypropylene, polyethylene, polyesters, cellulosics, polyacetals, polyurethanes, petroleum and wood resins, mineral oils, animal and vegetable fats, waxes, rubbers such as styrene-butadiene rubber (SBR), acrylonitrile - butadiene - styrene rubber (ABS), olefin-copolymers, ethylene - vinyl - acetate copolymers, polycarbonates, polyacrylonitrile, poly (4-methyl pentene-1) polymers, polyoxymethylenes, and the like. The present invention also relates to a novel procedure for preparing the aforesaid novel antioxidants and to stabilized compositions containing said novel antioxidants.

The prevention of oxidation of various organic materials is obviously of primary industrial concern and therefore, antioxidants are used in or added to a wide variety of commercial products such as synthetic polymers of the type indicated supra, oils, plastic materials, etc., which are normally subject to oxidative deterioration.

The novel antioxidants of the present invention are represented by the following formulae:

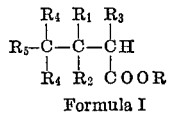 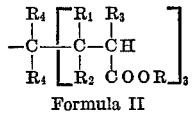

Formula I    Formula II

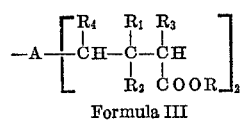

Formula III wherein
—R is

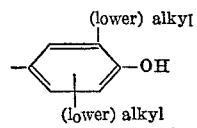

—R$_1$, —R$_2$, —R$_3$ are each hydrogen, lower alkyl, phenyl, aralkyl or —C$_m$H$_{2m}$COOR, where $m$ is 0 to 6
—R$_4$ is —CN, —COOR$_5$, —COOR. One of the R$_4$ groups can also be phenyl, —NHCOR$_5$ or —COOCH$_3$
—R$_5$ is hydrogen, alkyl, aryl or aralkyl,
—A— is —COOC$_n$H$_{2n}$OCO—, where $n$=2 to 6.

As used herein, alkyl covers groups having from 1 to 24 carbon atoms and preferably to 12 carbon atoms; lower alkyl covers groups containing from 1 to 6 carbon atoms. Aryl and aralkyl cover phenyl and alkyl substituted phenyl groups having up to 24 carbon atoms. In addition to alkyl said phenyl may also be substituted by a chlorine or bromine, alkyl, alkoxy, hydroxyl, alkylthio or a carboalkoxy group. An example of aralkyl is benzyl which may be substituted by chlorine or bromine, alkyl, alkoxy, hydroxyl, alkylthio or a carboalkoxy group. Where —R$_1$, —R$_2$ or —R$_3$ is —C$_n$H$_{2m}$COOR, $m$ is 0 to 6, but preferably 0 to 1.

The novel antioxidants of the present invention are addition products of (a) an $\alpha,\beta$-unsaturated ester of a hindered hydroquinone of the formula

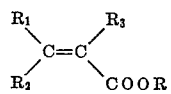

and (b) a malonate or a related compound with an active methylene group of the formula CH$_2$(R$_4$)$_2$, R$_5$CH(R$_4$)$_2$, R$_4$CH—A—CHR$_4$, wherein —R, —R$_1$, —R$_2$, —R$_3$, —R$_4$, —R$_5$ and —A— are as defined above. The addition reaction involving the $\alpha,\beta$-unsaturated ester and a malonate is affected in the presence of a base at temperatures varying from 0° C. up to about 200° C. as described in "Reactions of the Acrylic Esters" by E. H. Riddle, pages 172–185 (Reinhold Publishing Corp., New York, 1954). The preferred bases are alkoxides such as sodium or potassium methoxide or ethoxide or sodium hydride or sodium metal.

The novel antioxidants of this invention were prepared by using the following procedure: To a 0.1 molar amount of the malonate dissolved in dry benzene is added 0.01 mole of metallic sodium. After formation of the sodium salt, an equimolar amount of the $\alpha,\beta$-unsaturated ester is added and the reaction mixture is refluxed for 2 to 10 hours. Conversion is followed by thin layer chromatography. After completion of the reaction, the reaction mixture is neutralized with acetic acid and washed with water. The benzene layer is then dried over sodium sulfate. After evaporation of the benzene, the crude product is purified either by distillation or recrystallization as indicated in Table I. Yields are high in all cases, that is, higher than 80%.

Illustrative $\alpha,\beta$-unsaturated esters used in preparing the desired antioxidants of the present invention as indicated above, are represented by the following formula:

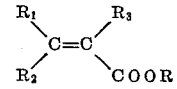

wherein R is

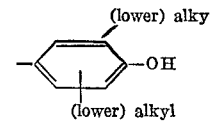

and R$_1$, R$_2$ and R$_3$ are as defined above.

Examples of such esters are:

| Esters of— | R$_1$ | R$_2$ | R$_3$ |
|---|---|---|---|
| Acrylic acid | —H | —H | —H |
| Methacrylic acid | —H | —H | —CH$_3$ |
| Crotonic acid | —CH$_3$ | —H | —H |
| Cinnamic acid | —C$_6$H$_5$ | —H | —H |
| Fumaric acid | —COOR | —H | —H |
| Maleic acid | —H | —COOR | —H |
| Mesaconic acid | —COOR | —H | —CH$_3$ |
| Citraconic acid | —H | —COOR | —CH$_3$ |
| Itaconic acid | —H | —H | —CH$_2$COOR |
| Aconitic acid | —COOR | —H | —CH$_2$COOR |

The preferred $\alpha,\beta$-unsaturated esters are esters of acrylic acid, fumaric and itaconic acid.

The preferred malonates and related compounds used in preparing antioxidants represented by Formula I when $R_5$ is hydrogen and II are dialkyl malonates and alkyl cyano acetates with alkyl groups having from 1 to 18 carbon atoms, malononitrile and malonates such as bis(3,5-di-tert-butyl-4-hydroxyphenyl)malonate. The latter compound was obtained by refluxing malonyl chloride with 2,6-di-tert-butylhydroquinone in benzene. The white crystals obtained from ethanol had a melting point of 183°–185°. Elemental analysis was as follows:

Percent: C: calc., 72.62; found, 72.80. H: calc., 8.65; found, 8.69.

The preferred malonates and related compounds used in preparing antioxidants represented by Formula I where $R_5$ is alkyl are dialkyl alkylmalonates and dialkyl acetamidomalonates having 1 to 18 carbon atoms and alkylmalonates with hindered phenolic ester groups, such as bis(3,5-di-tert-butyl - 4 - hydroxyphenyl) alkylmalonates, e.g. bis(3,5-di-tert-butyl-4-hydroxyphenyl) n - butylmalonate, obtained by refluxing n-butylmalonyl chloride with 2,6-di-tert-butylhydroquinone. The white crystals obtained from benzene had a melting point of 115–116.5°. Elemental analysis was as follows:

Percent: C: calc., 73.91; found, 74.06. H: calc., 9.22; found, 9.00.

The preferred malonates and related compounds used in preparing antioxidants represented by Formula III are alkylene dicyanoacetates with alkylene groups having from 2 to 12 carbon atoms.

Some of the preferred starting α,β-unsaturated ester compounds used in preparing the antioxidant compounds of the present invention are as follows:

(a) 3,5-di-tert-butyl-4-hydroxyphenyl acrylate $$CH_2=CH-COO-R_o$$

(b) Bis(3,5-di-tert-butyl-4-hydroxyphenyl) fumarate

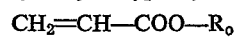

wherein $R_o$ is

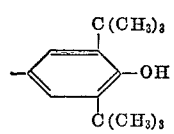

The aforesaid α,β-unsaturated esters (identified above as compounds (a) and (b) are reacted with the following malonates.

(c) Diethyl malonate $CH_2(COOC_2H_5)_2$
(d) Ethyl cyanoacetate $CNCH_2COOC_2H_5$ Table I below contains illustrative examples of the antioxidants of this invention with their properties and elemental analysis. These antioxidants have been prepared by the addition of the malonates to the α,β-unsaturated esters according to the general procedures described above.

TABLE I.—PROPERTIES AND ANALYSIS OF NOVEL ANTIOXIDANTS

| Product | Appearance | Melting or boiling point (° C.) crystallized from— | Elemental analysis | | | | | | Starting materials | Product |
|---|---|---|---|---|---|---|---|---|---|---|
| | | | Calculated | | | Found | | | | |
| | | | C | H | N | C | H | N | | |
| A | Colorless liquid | B.P. 222° at 0.3 mm. Hg. | 66.0 | 8.31 | | 66.43 | 8.33 | | (a)+(c) | 1,1-diethyl-3-(3,5-di-t-butyl-4-hydroxyphenyl)1,1,3-propanetricarboxylate $R_oOCOCH_2CH_2CH(COOC_2H_5)_2$ |
| B | White crystals | M.P. 65° (sinters) cyclohexane. | 69.67 | 8.06 | 2.20 | 69.55 | 7.98 | 2.22 | (b)+(d) | 1 plus ethyl-2,3-bis(3,5-di-t-butyl-4-hydroxyphenyl)-1-cyano-1,2,3-propanetricarboxylate $R_oOCOCHCH(CN)COOC_2H_5$ \| $R_oOCOCH_2$ |
| C | do | M.P. 65° (sinters) heptane. | 68.39 | 8.24 | | 68.44 | 8.52 | | (b)+(c) | 1,1-diethyl-2,3-bis(3,5-di-t-butyl-4-hydroxyphenyl)1,1,2,3-propanetetracarboxylate $R_oOCOCHCH(COOC_2H_5)_2$ \| $R_oOCOCH_2$ |
| D | do | M.P. 150-151° hexane | 69.07 | 8.48 | | 69.19 | 8.36 | | (a)+(c) | 3,3-diethyl-1,1,5-bis(3,4-di-t-butyl-4-hydroxyphenyl)-1,3,3,5-pentanetetracarboxylate $(R_oOCOCH_2CH_2)_2C(COOC_2H_5)_2$ |

Note.—In the above formulae. $R_o$ is defined supra.

Additional examples of novel antioxidants represented by Formulae I, II and III are listed in Table II. These antioxidants are prepared according to the procedure described supra, using metallic sodium, sodium methoxide or -ethoxide as catalysts. All malonates and related compounds listed in Table II are either commercially available (Kay-Fries Chemicals, Inc.) or are prepared as described in "Reactions of the Acrylic Esters" by E. H. Riddle, pages 182–183 (Reinhold Publishing Corp., New York, 1954). Malonates containing hindered phenolic groups are described above. The synthesis of all α,β-unsaturated esters containing hindered phenolic groups is described in my copending application Ser. No. 738,770, filed June 21, 1968.

One general method for preparing said unsaturated esters comprises reacting an alcohol dissolved in pyridine with an acid chloride. For example, 2,6-di-t-butylhydroquinone and acrylyl chloride yield 3,5-di-t-butyl-4-hydroxyphenyl acrylate; 2,6-di-t-butylhydroquinone and methacrylic chloride yield 3,5-di-t-butyl-4-hydroxyphenyl methacrylate; 2,6-di-t-butylhydroquinone and fumaryl chloride yield bis(3,5-t-butyl-4-hydroxyphenyl)fumarate; 2,6-di-t-butylhydroquinone and itaconyl chloride yield bis(3,5-di-t-butyl - 4 - hydroxyphenyl)itaconate; 2,6-di-t-butylhydroquinone and cinnamoyl chloride yield 3,5-di-t-butyl-4-hydroxyphenyl cinnamate. After the removal of the precipitated hydrochloride is removed, the reaction liquid is evaporated yielding crude product which is purified either by distillation or recrystallization.

TABLE II

| Antioxidant type | Malonates and related compounds | α,β-Unsaturated esters | | Novel antioxidants | |
|---|---|---|---|---|---|
| I | $CH_2(COOC_{18}H_{37})_2$ | + $CH_2{=}CHCOOR_o$ | → | $R_oOCOCH_2CH_2CH(COOC_{18}H_{37})_2$ | (E) |
|  | $CNCH_2COOC_{18}H_{37}$ | + $CH_2{=}C(CH_3)COOR_o$ | → | $R_oOCOCH(CH_3)CH_2CH(CN)COOC_{18}H_{37}$ | (F) |
|  | $CH_2(COOR_o)_2$ | + $CH_2{=}CHCOOR_o$ | → | $R_oOCOCH_2CH_2CH(COOR_o)_2$ | (G) |
|  | $C_6H_5CH_2CN$ | + $CH_2{=}CCOOR_o$<br>        $|$<br>     $CH_2COOR_o$ | → | $R_oOCOCHCH_2CH(CN)C_6H_5$<br>    $|$<br>$R_oOCOCH_2$ | (H) |
| II | $CH_2(CN)_2$ | + 2 $CH_2{=}CHCOOR_o$ | → | $(R_oOCOCH_2CH_2)C(CN)_2$ | (I) |
|  | $CNCH_2COOC_6H_{11}$ | + 2 $CH_2{=}CHCOOR_o$ | → | $(R_oOCOCH_2CH_2)C(CN)C_6H_{11}$ | (J) |
|  | $CH_2(COOR_o)_2$ | + 2 $CH_2{=}CHCOOR_o$ | → | $(R_oOCOCH_2CH_2)_2C(COOR_o)_2$ | (K) |
| I | $C_{16}H_{33}CH(COOC_2H_5)_2$ | + $CH_2{=}C(CH_3)COOR_o$ | → | $R_oOCOCH(CH_3)CH_2C(C_{16}H_{33})(COOC_2H_5)_2$ | (L) |
|  | $C_6H_5CH(COOCH_3)_2$ | + $CH_2{=}CCOOR_o$<br>        $|$<br>     $CH_2COOR_o$ | → | $R_oOCOCHCH_2C(C_6H_5)(COOCH_3)_2$<br>    $|$<br>$R_oOCOCH_2$ | (M) |
|  | $C_4H_9CH(COOR_o)_2$ | + $CH_2{=}CHCOOR_o$ | → | $R_oOCOCH_2CH_2C(C_4H_9)(COOR_o)_2$ | (O) |
| III | $(CNCH_2COOCH_2CH_2{-})_2$ | + 2 $CH_2{=}CHCOOR_o$ | → | $[R_oOCOCH_2CH_2CH(CN)COOCH_2CH_2{-}]_2$ | (P) |
|  | $(CNCH_2COOCH_2{-})_2$ | + 2 $[{=}CHCOOR_o]_2$ (trans) | → | $[R_oOCOCHCH(CN)COOCH_2{-}]_2$<br>    $|$<br>$R_oOCOCH_2$ | (Q) |

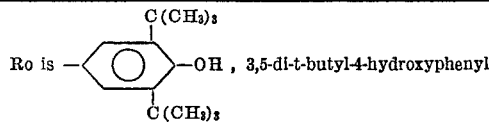

$R_o$ is 3,5-di-t-butyl-4-hydroxyphenyl

The oxidation of most polymers is so slow at ambient temperatures, even in the absence of antioxidants, that testing of the effects of antioxidants must necessarily be conducted at high temperatures in order to yield results within a convenient period of time. The tests conducted on the materials listed in the following table were conducted in a tubular oven with an airflow of 400 cubic feet per minute at an oven temperature of 150° C. The oven aging is set out in hours.

In preparing the sample for testing, unstabilized polypropylene powder is thoroughly blended with the indicated antioxidant. The blended material is thereafter milled on a two-roller mill at a temperature of 182° C. for six minutes after which time the stabilized polypropylene is sheeted from the mill and allowed to cool. The milled polypropylene sheet which has been stabilized is then cut into small pieces and pressed for seven minutes on a hydraulic press at 218° C. and 174 p.s.i. pressure. The resultant sheet of 25 mil thickness is then tested for resistance to accelerated ageing in the above described tubular oven. In Table III are reported the results of the oven ageing tests in which the antioxidants of this invention were added to polypropylene together with the indicated ultraviolet light absorber and the synergist.

TABLE III
Evaluation of Novel Antioxidants in Polypropylene (25 mil), Tubular Oven, 150° C.

| Product | Hours to fail | |
|---|---|---|
|  | 0.25% antioxidant plus 0.5% UV-2[1] | 0.1% antioxidant plus 0.5% UV-2[1] 0.3% DSTDP[2] |
| A | 40 | 40 |
| B | 90 | 400 |
| C | 120 | 480 |
| D | 300 | 1,260 |

[1] UV-2, an ultraviolet absorber, 2-(3',5'-di-tert-butyl-2'-hydroxyphenyl)-5-chlorobenzotriazole.
[2] DSTDP = distearylthiodipropionate, commercial synergist for antioxidants.

Results similar to those reported in Table III are obtained when the antioxidants of Table II are employed together with the indicated synergists and ultraviolet absorbers.

| Product | Secondary antioxidant | UV absorber |
|---|---|---|
| E | DSTDP | 2-(3'-t-butyl-2'-hydroxy-5-methylphenyl)-5-chlorobenzotriazole. |
| F | DLTDP[1] | 2-hydroxy-4-n-octyloxybenzophenone. |
| G | Tris-nonylphenylphosphite. | 4-dodecyloxy-2-hydroxybenzophenone. |
| H | Trilauryl trithiophosphite. | 4-t-octylphenyl salicylate. |
| I | DLTDP | Phenylsalicylate. |
| J | DLTDP | 4-t-butylphenyl salicylate. |
| K | Tris-nonylphenylphosphite. | 2,4-dihydroxybenzophenone. |
| L | DSTDP | 2-hydroxy-4-methoxybenzophenone. |
| M | Trilauryl trithiophosphite. | 5-chloro-2-hydroxybenzophenone. |
| N | DSTDP | 4-t-octylphenyl salicylate. |
| O | DLTDP | 2-(2'-hydroxy-5' methylphenyl)benzotriazole. |
| P | DSTDP | Dibenzoylresorcinol. |
| Q | DLTDP | 2-(3',5'-di-t-butyl-2'-hydroxyphenyl)-5-chlorobenzotriazole. |

[1] DLTDP = dilaurylthiodipropionate.

It should be noted that in all above examples of stabilizing compositions the use of a secondary antioxidant and an ultraviolet absorber is optional. However, for best results, said additives should be employed in conjunction with the antioxidants of this invention, especially the secondary antioxidant. These additional additives may be used in the amount of from about 0.05 to about 5% each, and preferably from about 0.1 to about 2% by weight of the substrate.

Besides activity in the oven ageing test, the novel antioxidants of the present invention are characterized by excellent color values (no discoloration during the oven ageing test) and good gas fading properties.

The present antioxidants are useful in protecting synthetic polymers such as polypropylene against oxidation in air, thermal degradation or deterioration by including such substances, a stabilizing amount of the antioxidant which will vary between about 0.01 and 5% and preferably, from about 0.05 to about 1.0% by weight. The antioxidant can be incorporated into the synthetic polymers using conventional procedures. For example, the antioxidants of the present invention are incorporated into the material to be stabilized by any suitable means such as by milling the antioxidant on hot or cold mill rolls, by mixing it in by the use of a Banbury mixer or other well-known devices of this nature or the antioxidants may be mixed with a polyolefin material in the form of molding powder and incorporated during extrusion or prior to extrusion or during injection molding. The antioxidant may even be incorporated into a solution of the polyolefin material and the solution may then be employed for the formation of films, for wet or dry spinning of fibers, monofilament and the like.

The examples set out above are to be considered as illustrative of the present invention and are not to be considered as restrictive. It is therefore to be understood that the invention is not limited to the specific embodiments set out above except as defined in the appended claims.

What is claimed is:

1. A compound of the formula:

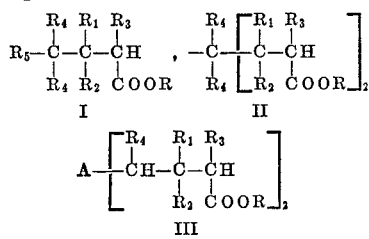

wherein

R is

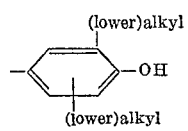

$R_1$, $R_2$ and $R_3$ are each hydrogen, lower alkyl, phenyl, or $-C_mH_{2m}COOR$, where $m$ is 0 to 6

$R_4$ is $-CN$, $-COOR_5$, $-COOR$, or phenyl, provided that no more than one $R_4$ is phenyl $R_5$ is hydrogen, alkyl having 1-24 carbon atoms, or phenyl and $-A-$ is $-COOC_nH_{2n}OCO-$, where $n$ is 2 to 6.

2. A compound according to claim 1 wherein R is

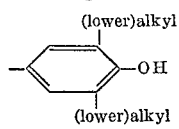

3. A compound according to claim 1 wherein, in the group $-C_mH_{2m}COOR$, $m$ is 0 or 1.

4. A compound according to claim 1 wherein in Formula I, $R_1$, $R_2$, $R_3$ and $R_5$ are hydrogen, $R_4$ is $-COOC_2H_5$ and R is 3,5-di-tert-butyl-4-hydroxyphenyl group.

5. A compound according to claim 1 wherein in Formula I, $R_1$, $R_3$ and $R_5$ are hydrogen, $R_2$ is $-COOR$, one $R_4$ is $-CN$ and the other $R_4$ is $-COOC_2H_5$ and R is 3,5-di-tert-butyl-4-hydroxyphenyl group.

6. A compound according to claim 1 wherein in Formula I, $R_1$, $R_3$ and $R_5$ are hydrogen, $R_2$ is $-COOR$, $R_4$ is $-COOC_2H_5$ and R is 3,5-di-tert-butyl-4-hydroxyphenyl group.

7. A compound according to claim 1 wherein in Formula II, $R_1$, $R_2$ and $R_3$ are hydrogen, $R_4$ is $-COOC_2H_5$ and R is 3,5-di-tert-butyl-4-hydroxyphenyl group.

8. A malonate having the formulae $CH_2(COOR)_2$ and $R_5CH(COOR)_2$ wherein R is (lower) alkyl
—⟨○⟩
(lower) alkyl and $R_5$ is alkyl having 1–24 carbon atoms, or phenyl.

9. A malonate according to claim 8 wherein R is 3,5-di-tert-butyl-4-hydroxyphenyl group.

10. A malonate according to claim 8 wherein R is 3,5-di-tert-butyl-4-hydroxyphenyl group and $R_5$ is n-butyl group.

References Cited

UNITED STATES PATENTS 3,522,207  7/1970  Hayer et al. _____ 260—45.85

OTHER REFERENCES

Chem. Abstracts 59:9858d.

JAMES A. PATTEN, Primary Examiner

V. GARNER, Assistant Examiner

U.S. Cl. X.R.

252—404; 260—45.85, 471 A, 475 SC, 479 R, 479 S, 479 A